United States Patent [19]

Wieder et al.

[11] 4,276,389

[45] Jun. 30, 1981

[54] GRAFT POLYMERS CONTAINING SILICON

[75] Inventors: Wolfgang Wieder, Leverkusen; Josef Witte; Hans-Heinrich Moretto, both of Cologne; Helmut Steinberger, Leverkusen, all of Fed. Rep. of Germany

[73] Assignee: Bayer Aktiengesellschaft, Fed. Rep. of Germany

[21] Appl. No.: 105,224

[22] Filed: Dec. 19, 1979

[30] Foreign Application Priority Data

Dec. 30, 1978 [DE] Fed. Rep. of Germany ....... 2856836

[51] Int. Cl.$^3$ ............................................. C08G 77/42
[52] U.S. Cl. .................................... 525/61; 525/100; 525/106
[58] Field of Search .................. 525/61, 100, 106, 58, 525/369

[56] References Cited

U.S. PATENT DOCUMENTS

| | | | |
|---|---|---|---|
| 3,488,337 | 1/1970 | Jones ........................................ | 525/61 |
| 3,539,658 | 11/1970 | Sekmakas et al. ................... | 525/100 |
| 3,691,257 | 9/1972 | Kendrick et al. ..................... | 525/106 |

*Primary Examiner*—Wilbert J. Briggs, Sr.
*Attorney, Agent, or Firm*—Connolly and Hutz

[57] ABSTRACT

Graft polymers having improved low temperature characteristics of optionally partially or completely saponified vinyl ester homopolymers or copolymers as graft substrates and grafted siloxane units.

10 Claims, No Drawings

GRAFT POLYMERS CONTAINING SILICON

The present invention relates to graft polymers of vinyl ester homopolymers or copolymers which may be partially or completely saponified as graft substrates and grafted siloxane units, to a process for the preparation of such graft polymers and to their use as materials having good flexibility at low temperatures.

It is well known that ethylene/vinyl acetate copolymers generally have thermoplastic properties and that they become rubber-like at vinyl acetate contents in the region of from about 40 to 50% by weight. Ethylene/vinyl acetate copolymers with a vinyl acetate content of 45% by weight, for example, have dynamic freezing temperatures of approximately −22° C.

Such copolymers are used as elasticizing agents to increase the impact strength, notched impact strength and elongation at break, e.g. in polyvinyl chloride used, for instance, for forms and sections in the building sector and for foils, tubes and cable sheaths.

It has now been found that monomers which contain silicon can be grafted on unsaponified or partially or completely saponified homopolymers or vinyl esters to produce products with reduced freezing temperatures.

Accordingly, the present invention provides graft polymers having a silicon content of from 0.1 to 20% by weight from (a) a graft basis of homopolymers or copolymers with incorporated vinyl ester and/or vinyl alcohol units and (b) grafted units corresponding to the following formula I

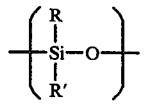 (I)

wherein

R and R', which may be the same or different, are each a substituted or unsubstituted aliphatic, cycloaliphatic, monoolefinic or aromatic group having from 1 to 20 carbon atoms.

The present invention also provides a process for the preparation of graft polymers containing grafted siloxane units, characterised in that an optionally partially or completely saponified homopolymer or copolymer of a vinyl ester of an aliphatic $C_1$–$C_{18}$ monocarboxylic acid is first reacted, either solvent-free or as a solution in an organic solvent, at a temperature of from 20° to 200° C., with 0.01 to 5% by weight, based on the polymer, of an inorganic base corresponding to one of the following formulae II, III, or IV:

 (II);

 (III);

 (IV)

wherein

Me is an element of the first or second main group of the periodic system;

n = 1 or 2; and

R" is a hydrogen atom or an aliphatic, cycloaliphatic or aromatic group having from 1 to 20 carbon atoms, and is then reacted with cyclic siloxanes corresponding to the following formula V

 (V)

wherein

R and R' are as hereinbefore defined and x is an integer of from 3 to 10.

The substances used as graft basis may be homopolymers of vinyl esters of aliphatic monocarboxylic acids having from 1 to 18 carbon atoms or their copolymers with $C_2$–$C_4$ olefins such as ethylene, propylene or isobutylene, preferably ethylene. Examples of suitable vinyl esters are vinyl formate, vinyl acetate, vinyl propionate, vinyl butyrate, vinyl isobutyrate, vinyl caproate, vinyl laurate, vinyl stearate and vinly benzoate, vinyl acetate being preferred. Ethylene/vinyl acetate copolymers are preferred among the vinyl ester copolymers, particularly those incorporating from 1 to 75% by weight and most preferably from 5 to 50% by weight of vinyl acetate.

Equally suitable as graft basis are the partially or completely acid or alkaline saponified homopolymers or copolymers of the above mentioned vinyl esters, for example, polyvinyl alcohol, ethylene/vinyl alcohol and ethylene/vinyl alcohol/vinyl acetate copolymers.

The vinyl ester homopolymers and copolymers may be prepared by the known methods of high pressure or medium pressure synthesis, for example in solvents such as tertiary butanol or in emulsion. Preparation of the partially or completely saponified homopolymers or copolymers may also be carried out by known methods, e.g. by saponification of the vinyl ester polymers in aqueous or aqueous-alcoholic medium in the presence of an acidic or basic catalyst such as hydrogen chloride or sodium hydroxide.

To carry out the process according to the present invention, the polymers used as graft substrate are first treated with an organic or inorganic base so that basic centers are formed on the polymer chain, which centers are then capable of effecting a ring opening polymerisation of the cyclic siloxanes used as graft monomers. In one embodiment of the graft reaction according to the present invention, the dissolved graft substrate is treated with a base and the graft monomer is then added, whereupon grafting takes place.

According to another embodiment of the process of the present invention, the graft substrate is treated with a base in the presence of the cyclic siloxanes at a temperature low enough to prevent homopolymerisation of the siloxanes. Grafting is then effected by increasing the temperature.

Suitable organic and inorganic bases are those corresponding to the afore mentioned formulae II, III or IV, but the bases used need not necessarily completely dissolve in the reaction medium. The following are mentioned as examples: $LiOCH_3$, $NaOCH_3$, $KOCH_3$, LiOEt, NaOEt, KOEt, Li-tertiary butylate, Na-tertiary butylate, K-tertiary butylate, (Iso)propylates of alkali metals or alkaline earth metals, organometallic bases such as methyl, ethyl, propyl or butyl lithium, phenyl lithium, benzyl sodium, $LiNH_2$, $NaNH_2$, $KNH_2$, LiOH, NaOH, KOH, LiH, NaH and KH.

The base is added to the reaction mixture in quantities from 0.01 to 5% by weight, based on the weight of graft substrate. It is, of course, possible to use mixtures of these bases, for example a mixture of sodamide and sodium alcoholate or a mixture of butyl lithium and potassium tertiary butylate.

Suitable for use as silicon-containing graft monomers are the cyclic oligosiloxanes of the above mentioned formula V in which R and R' are the same or different and are each a substituted or unsubstituted aliphatic, cycloaliphatic, monoolefinic or aromatic group having from 1 to 20 carbon atoms. The following are examples of R and R': methyl, ethyl, vinyl, propyl, phenyl, tolyl and xylyl. Preferably, R=R' methyl. The number x of siloxane units in the cyclic graft monomers is an integral value of from 3 to 10 and is preferably 3 or 4. Mixtures of these silicon containing graft monomers may be used, for example a mixture of hexamethyl cyclotrisiloxane ($D_3$) and octamethyl cyclotetrasiloxane ($D_4$).

The graft reaction according to the present invention may be carried out in solution or in solvent-free conditions, for example in an extruder screw. It may also be carried out in an excess of the graft monomer and the excess may then be removed after the reaction has been completed, e.g. by evaporation.

If the reaction is to be carried out in solution, any conventional solvents capable of dissolving the graft substrate without reacting with the bases or with the graft monomers may be used. Examples of suitable solvents include aliphatic hydrocarbons, aromatic hydrocarbons such as benzene, toluene and xylene, pyridine, diethyl ether, tetrahydrofuran, dioxane, diethylene and triethylene glycol dimethyl ether, diethylene and triethylene glycol diethyl ether and mixtures thereof. In one embodiment of the process according to the present invention, for example, the graft substrate may be dissolved in a mixture of a relatively apolar solvent such as toluene and a relatively polar solvent such as glycol ether and the grafting reaction may be carried out in this solvent mixture.

The reaction temperatures may be in the range of from 20° to 200° C. and may be varied in the course of the reaction if desired. For example, the graft substrate may be dissolved at an initial temperature (a), the reaction with the base may be carried out at another temperature (b) and the grafting reaction after addition of the graft monomer may finally be carried out at a suitable temperature (c).

The graft polymers according to the present invention may be isolated by the usual methods, for example they may be freed from solvent and excess monomer by evaporation or by stripping with steam or else they may be isolated by precipitation.

The silicon-containing graft polymers prepared by the process according to the present invention contain from 0.1 to 20% by weight, preferably 3 to 15% by weight of silicon. They are suitable for use as coating and sealing compositions which are characterised by their good flexibility at low temperatures and as materials for cable sheaths, flexible tubes, profiles and shaped products having improved low temperature characteristics.

The following further examples illustrate the present invention. In all cases percentages are by weight.

EXAMPLE 1

100 g of an ethylene/vinyl alcohol copolymer obtained by saponification of an ethylene/vinyl acetate copolymer having a vinyl acetate content of 33% is added to a mixture of 450 ml of diethylene glycol dimethyl ether and 2 g of NaOH powder. The mixture is heated to 50° C. and 100 g of hexamethyl cyclotrisiloxane ($D_3$) is then introduced. The mixture is left to react for 18 hours at 90° C., after which time it is precipitated in water, washed with water until neutral and then dried. 128 g of a polymer having a silicon content of 7.9% is obtained.

EXAMPLE 2

100 g of the same ethylene/vinyl alcohol copolymer as used in Example 1 is dissolved in 1 liter of anhydrous toluene at 100° C. under a nitrogen atmosphere. 20 g. of $D_3$ are introduced after the addition of 10 m mol of butyl lithyium (as 2.1 molar solution in hexane). Stirring is continued for a further 14 hours at 100° C. The reaction mixture is then left to cool and is precipitated from methanol. 94 g of a polymer having a silicon content of 4.0% is obtained after washing and drying.

EXAMPLE 3

100 g of an ethylene/vinyl acetate copolymer having a vinyl acetate content of 8% is dissolved in 500 ml of diethylene glycol dimethyl ether at 145° C. 0.54 g of sodium methylate is added and the reaction mixture is stirred for 20 minutes and then left for a further 4 hours at 145° C. after the addition of 100 g of $D_3$. 124 g of polymer having a silicon content of 7.1% is obtained after precipitation in water, washing and drying.

EXAMPLE 4

100 g of the same ethylene/vinyl acetate copolymer as used in the previous Example is dissolved in a mixture of 1 liter of toluene and 20 ml of diethylene glycol dimethyl ether at 100° C. 0.6 g of $NaOCH_3$ is added, followed after 5 minutes by 20 g of $D_3$. The mixture is kept gently boiling for 14 hours and after this time is precipitated in alcohol.

Yield of dry polymer: 110 g, silicon content 3.0%.

EXAMPLE 5

100 g of an ethylene/vinyl acetate copolymer having a vinyl acetate content of 33% is dissolved in 500 ml of toluene at 100° C. 0.6 g of $NaOCH_3$ is added and the mixture is then stirred for 5 minutes. 20 g of $D_3$ is subsequently added and the reaction mixture is maintained at 100° C. for 4 hours. After this time, the mixture is precipitated in methanol. The dried polymer obtained in a yield of 113 g contains 4% of silicon.

EXAMPLE 6

Example 5 is repeated except that 50 g of $D_3$ instead of 20 g is used. 136 g of a polymer having a silicon content of 10.4% is obtained.

EXAMPLE 7

The procedure is the same as that followed in Example 6 except that the reaction mixture is maintained at 70° C. for 14 hours. Polymer yield 130 g with a silicon content of 9.2%.

EXAMPLE 8

This example is similar to Examples 5 and 6 except that 100 g of $D_3$ are added as graft monomer. Yield of dried polymer: 151 g, silicon content 12.3%. The material has a softening range of from −55° C. to −39° C.

EXAMPLE 9

100 g of the same ethylene/vinyl acetate copolymer as used in Example 5 is dissolved in an anhydrous mixture of 1 liter of toluene and 20 ml of diethylene glycol methyl ether at 100° C. under a nitrogen atmosphere. 50 g of $D_3$ is introduced 5 minutes later, after the addition of 10 m mol of butyl lithium. The reaction product is precipitated in methanol after 4 hours, washed with methanol and then dried in a vacuum at 50° C. Yield: 131 g of a polymer with a silicon content of 8.4%.

EXAMPLE 10

100 g of an ethylene/vinyl acetate copolymer having a vinyl acetate content of 45% is dissolved in 500 ml of toluene at 100° C. 0.3 g of sodium methylate is added, followed 5 minutes later by 50 g of $D_3$, and the reaction mixture is then stirred for 4 hours at 100° C. Precipitation in methanol and dehydration in a vacuum at 50° C. yields 124 g of a polymer with a silicon content of 7.3%.

EXAMPLE 11

100 g of the same ethylene/vinyl acetate copolymer as used in Example 10 is dissolved in 500 ml of toluene at 70° C.

After the addition of 0.6 g of $NaOCH_3$, the reaction mixture is stirred for 5 minutes and 50 g of $D_3$ is then introduced. The temperature is maintained at 70° C. for 14 hours and after this time, the reaction product is precipitated in methanol. 130 g of a polymer having a silicon content of 8.4% is obtained after drying.

EXAMPLE 12

This Example is carried out in the same manner as that described in Example 10 except that 1.2 g of sodium methylate is added instead of 0.3 g thereof. Yield of dry polymer: 130 g, silicon content 8.2%.

EXAMPLE 13

This Example is similar to Example 12 except that 100 g of $D_3$ instead of 50 g is added. 161 g of a colourless polymer having rubber-like properties and a silicon content of 14.3% is obtained. The softening temperature is in the range of from −50° C. to −39° C.

EXAMPLE 14

100 g of an ethylene/vinyl acetate copolymer having a vinyl acetate content of 33% is dissolved in 600 ml of toluene at 100° C. under a nitrogen atmosphere. After the addition of 0.6 g of $NaOCH_3$, 100 ml of toluene is distilled off and 50 g of $D_3$ is then added. The temperature is then maintained at 100° C. for 4 hours. After this time polymerisation is stopped by the addition of 10 ml of acetic acid and the reaction product is then precipitated in methanol. 118 g of a polymer having a silicon content of 5.7 g is obtained after drying.

We claim:

1. A graft polymer having a silicon content of from 0.1 to 20% by weight which consists of
   (a) a graft basis of a homopolymer or copolymers incorporating vinyl ester and/or vinyl alcohol units; and
   (b) grafted units having the formula (I)

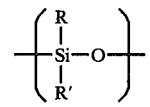

wherein R and R' are the same or different and each is a substituted or unsubstituted aliphatic, cycloaliphatic or aromatic group having from 1 to 20 carbon atoms.

2. A graft polymer as claimed in claim 1 having a silicon content of from 3 to 15% by weight.
3. A graft polymer as claimed in claim 1 or claim 2 wherein R and R' are the same, and each is a methyl group.
4. A graft polymer as claimed in claim 1 wherein the graft basis is an optionally partially or completely saponified copolymer of $C_2$–$C_4$ olefin and the vinyl ester of an aliphatic $C_1$–$C_{18}$ monocarboxylic acid.
5. A graft polymer as claimed in claim 4 wherein the graft basis is an ethylene/vinyl acetate copolymer having a vinyl acetate content of from 1 to 75% by weight.
6. A graft polymer as claimed in claim 5 wherein the ethylene/vinyl acetate copolymer has a vinyl acetate content of from 5 to 50% by weight.
7. A graft polymer as claimed in claims 5 or 6 wherein the vinyl acetate units are partially or completely saponified.
8. A process for the preparation of a graft polymer as claimed in claim 1 which comprises:
   (i) reacting an optionally partially or completely saponified homopolymer or copolymer of a vinyl ester of an aliphatic $C_1$–$C_{18}$ monocarboxylic acid in solvent-free condition or in an organic solvent at a temperature of from 20° to 200° C. with 0.01 to 5% by weight, based on the polymer, of an inorganic or organic base corresponding to formulae II, III, IV, or mixtures thereof $$Me(OR'')_n \quad (II);$$

$$Me(R'')_n \quad (III);$$

$$Me(NR''_2)_n \quad (IV)$$

wherein Me is an element of the first or second main group of the periodic system, n is 1 or 2 and R'' is a hydrogen atom or an aliphatic, cycloaliphatic or aromatic group having from 1 to 20 carbon atoms; and (ii) reacting the product of step (i) with one or more cyclic siloxanes of formula (V),

wherein R and R' are as defined in claim 1 and x is an integer of from 3 to 10.

9. A process as claimed in claim 8 wherein R and R' are the same and each is a methyl group and x has a value of 3 or 4.
10. Coating compositions, sealing compositions, cable sheaths, flexible tubes and moulded plastics whenever made from a graft polymer as claimed in claim 1.